UNITED STATES PATENT OFFICE.

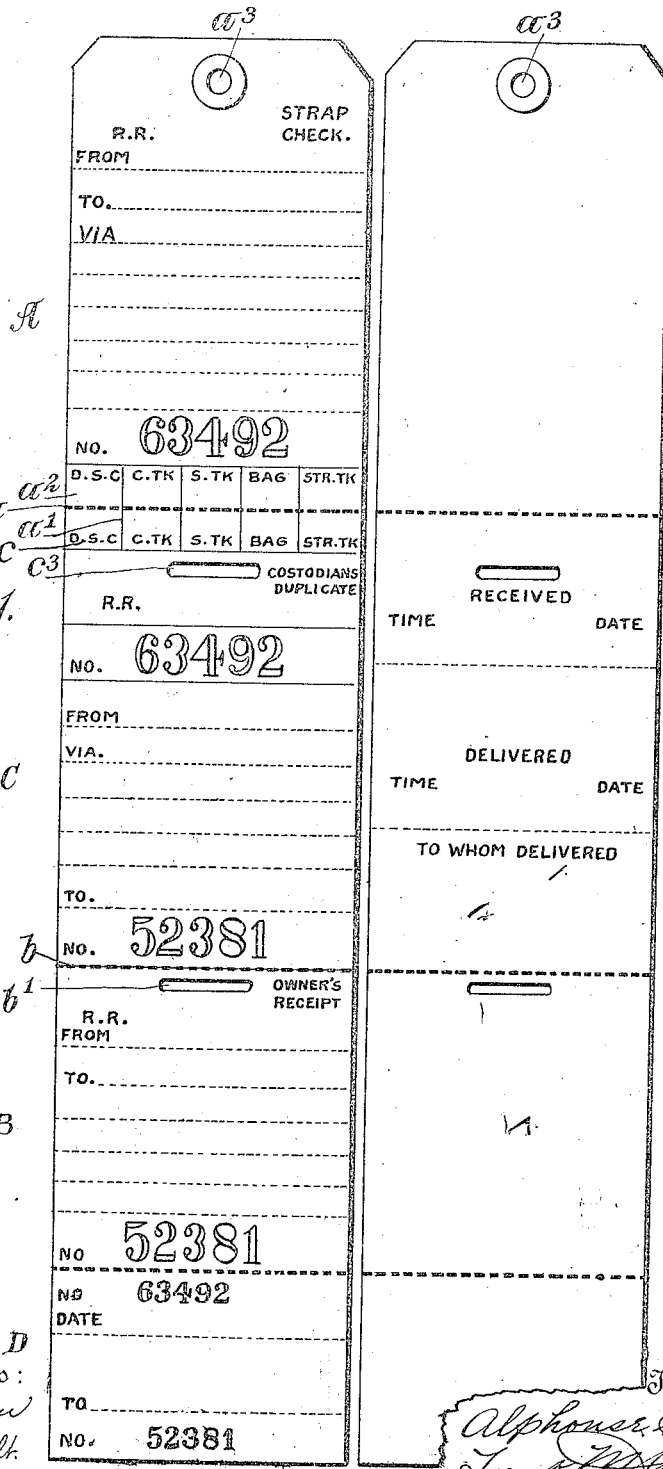

ALPHONSE S. RHEAUME, OF NEW YORK, N. Y.

TAG OR CHECK.

No. 922,510.　　　　Specification of Letters Patent.　　　Patented May 25, 1909.

Application filed January 26, 1907. Serial No. 354,195.

*To all whom it may concern:*

Be it known that I, ALPHONSE S. RHEAUME, a citizen of the United States, and residing at West Two Hundred and Thirty-seventh street, Hudson Park, New York city, county and State of New York, have invented certain new and useful Improvements in Tags or Checks, of which the following is a specification.

The subject of this invention is a novel check or tag more particularly designed for use in connection with systems for the checking of baggage, and prominent objects of the invention are to promote accuracy in the checking and delivery of baggage, insure prevention against fraud or theft in the substitution of checks applied to the baggage, prevent the establishment of the identity between the check section held by the person applying for the baggage and that applied to the baggage except through the medium of a key section in the possession of the actual custodian of the baggage at the time of application therefor, and in the event of an error being made in the checking of the baggage, to facilitate the convenient rectification of the same.

In the accompanying drawing forming part of this specification,—Figure 1, is a face view of one form of check or tag embodying my invention. Fig. 2, is a view of the reverse side or back of said check or tag.

Similar reference characters are employed to designate corresponding parts in the figures of the drawing, wherein they occur.

The check or tag primarily embodies triplicate sections, one of which is to be applied to the baggage, a second section to be delivered to the owner, and a third section designed to be in possession of the actual custodian of the baggage irrespective of a change in its custody between its receipt from and delivery to the owner or other party entitled to receive said baggage at the point of destination. The first mentioned section will be referred to herein as the "strap check", the second section as the "owner's receipt" and the third section as the "master check", said strap check bearing a numeral or device dissimilar from a numeral or device on the owner's receipt, while the master check is provided with the numerals or devices of both the strap check and owner's receipt, said master check thus becoming a key section for establishing identity between said check and receipt, and also for subserving other purposes in furtherance of the invention.

In the embodiment of the check or tag disclosed in the illustrations, the three sections are to be printed on a strip of paper-board of suitable quality and thickness, so that said sections will be in connected relation but readily detachable from each other by cutting or severing along indented or perforated lines provided for such purpose. The strap check A, and owner's receipt B, are shown as being connected at the top and bottom respectively, of the master check C, the detachment of said check and receipt from the intermediately located duplicate, being indented along the dotted lines $a$, $b$. As illustrated, the check A, contains the words "Strap check" and a designating number, that indicated being 63492 which appears conspicuously. In addition, the check A, contains printed matter providing for a record on said check of the line of railroad over which the baggage is primarily transported, the checking and delivery stations, and the word "Via" and accompanying spaces providing for a record of the connecting lines over which the baggage may be carried.

The receipt B, in addition to the words "Owner's receipt" has a number designation dissimilar from that borne by the check A, said receipt, in the drawing, disclosing 52381 as the numeral. The face of the receipt may, like the check A, contain printed matter providing for a record of the checking railroad, the checking and delivery stations, and connecting roads.

I prefer that a series of vertical parallel lines $a'$, shall cross the dotted line $a$, so as to present at the bottom portion of the check A and top portion of the duplicate C, transverse series of small subdivisional spaces $a^2$, $c$, containing abbreviations indicative of different kinds of baggage, similar abbreviations on both the check and duplicate being complementarily disposed with respect to each other. For instance the spaces $a^2$, $c$, at the extreme left of Fig. 1, each contains the letters "D. S. C." referring to a dress suit case. The next pair of spaces $a^2$, $c$, each contains the abbreviation C. Tk, indicative of a canvas trunk, the remaining pairs of companion spaces having successively, further abbreviations for other classes of baggage. For instance "S. Tk" represents a sample trunk, the meaning of the word "Bag" being obvious, while "Str. Tk" refers to a steamer trunk.

The duplicate C, in addition to the words "master check," and printed provision for a record of the checking road, checking and delivery stations, and for connecting lines, also contains the numerical designations of both the strap check A, and the owner's receipt B, the numbers 63492, and 52381, appearing prominently at the upper and lower portions respectively of said duplicate.

The manner in which the novel check or tag is intended to be used, is as follows: At the time of checking the baggage, the receipt section B, is detached from the master check C and handed to the owner or party checking the baggage, said receipt containing memoranda relative to the railroad checking and delivery stations as well as a connecting line or lines. The baggage official or attendant, notes the character of the baggage and classifies it on the face of both the strap-check and the master check by some indication in the appropriate subdivisional spaces $a^2$, $c$, said indication being accomplished in any suitable manner as by marking with a pencil or the use of a punch. This marking or punching will enable an official or attendant to determine at a glance, whether the checked baggage is a dress suit case, canvas trunk or of some one of the other baggage classification noted. Both the check A, and duplicate C, likewise contain a record similar to that described with reference to the owner's receipt. As thus conditioned, the check A is detached from the master check and fixed to the proper piece of baggage, it being intended that the duplicate C, shall be delivered to and retained by the official or employee who has actual custody of said checked baggage. Thus at the time of checking, the duplicate C will be held by the baggage master or his recognized representative at the checking station. When the baggage is transferred to the baggage-car, said duplicate will be delivered to and retained by the baggage official in charge of that car, and when said baggage leaves said car either at the delivery station or for transfer to some connecting road, the said duplicate passes into the possession of the official or employee charged with the custody of said baggage, either for delivery to a person properly presenting the owner's receipt, or to the official or employee in charge of the baggage on the connecting line.

It will be noted that in so far as the numeral designations on the strap-check and owner's receipt respectively, are concerned, their dissimilarity is such as to destroy or eliminate the identity of the baggage called for by the owner's receipt except for the information represented by the matter on the master check, which thus constitutes a key for readily and accurately establishing such an identity. Therefore, when an owner's receipt is presented for reclaiming the baggage, the employee receiving such receipt immediately has recourse to the master check and thereby ascertains the number on the strap-check as well as the character of the baggage and is thus enabled to readily locate such baggage and deliver the same to the proper party applying for it. Blank duplicates with their attached checks and receipts, can be maintained in such classified order and numerical sequence, as to facilitate the systematic checking of the different pieces of baggage successively left for transfer. The duplicates during the transfer of the baggage and also after its delivery can be placed in properly indicated compartments in a case. I have represented both the duplicate C, and receipt B, as containing in their upper portions, narrow transverse slots $b'$, and $c^3$, respectively. The slots $c^3$ will permit the duplicates to be hung in an orderly manner upon a flat hook provided for the purpose, or strung upon a thin split ring of band-metal, while the slots in the receipts B will permit the latter to be correspondingly engaged upon a similar hook or ring, and if desirable, upon the ring carrying the duplicates C, in which event it will be of convenience to have each receipt in immediate relation to the duplicate it pertains to, thus providing a record incident to the transmission of the baggage as well as evidence showing its delivery to the owner or other party or agent authorized to receive the same.

As is known to those familiar with baggage systems, the checks or tags are printed in different series or groups known as "forms" which word, "Form", appears upon said checks or tags accompanied by some numeral or other character indicative of the form group to which it belongs. I can print my checks or tags in distinct form groups, for each of which, a predetermined key is provided, enabling a properly advised person upon inspection of the number on an owner's receipt, to determine the dissimilar number on the strap-check. Thus, for instance, the number on the owner's receipt appearing in the drawing, is 52381 the selected key for which is 11111. Now with the knowledge of such key and in the event of the remote possibility of the master check being lost, destroyed, or misplaced, the party conversant with said key, will immediately be able to determine the number on the check of the baggage sought for, by the addition of the key number to that on the owner's receipt, resulting in the number 63492. Manifestly, in the absence of the master check, the number on the owner's receipt can be readily determined by the party holding the key, by subtracting the key number from that on the strap-check.

In order to increase the serviceability of the master check for the purpose of establishing a complete record in connection with the transaction to which it refers, the back of each duplicate may contain printed matter providing for noting the time and date when the baggage was received, correspondingly the time and date of delivery and the brief record of the party to whom the baggage was delivered.

With a view of rendering the improved check or tag still more complete, a fourth section D, in the form of a short stub can be attached at the bottom of the owner's receipt to be detached therefrom, said stub having at its upper portion, the number of the strap check, and at its lower portion, the number of the owner's receipt, in addition to which, it may have provision for noting the date the baggage was checked and the delivery station. It is intended that this stub shall contain an identifying indication of the subordinate who affixed the strap check to the baggage, and that said stub will be turned in and retained with other similar stubs at the station where the baggage was received and checked. Consequently, if any error is committed in checking the baggage, reference need only be had to the stubs at the checking station, in order to promptly determine who the subordinate was who committed the error. The subordinate's indication on the check, may be made by marking (preferably indelibly) his initial or initials on the stub, or by his employing a punch that will perforate said stub in the form of a letter constituting the initial of his surname.

The strap check contains near its top edge, a perforation $a^3$, for the passage of the attaching cord.

I do not limit myself to the precise arrangement of sections and matter thereon shown and described, as it will be obvious that both the arrangement and matter may widely vary and the check or tag still be within the scope of my invention as defined by the appended claim. For instance, in lieu of the dissimilar numbers on the strap check and owner's receipt, differing devices, characters or symbols may be employed, under which circumstances, the master check will contain the devices, etc., of both the check and the receipt. The numerical system however, for practical purposes, is believed to be more simple and likewise more serviceable in admitting of the employment of an identifying key.

Having now described my invention, what I claim as new and desire to secure by Letters Patent, is,—

A check or tag for the purpose described, comprising sections having dissimilar designations respectively and an identifying section provided with the dissimilar designations of the sections first mentioned, and an additional section in the form of a stub and also provided with the dissimilar designations of the sections first mentioned, for acting as a checking record at the point at which the baggage is checked.

In testimony whereof, I, ALPHONSE S. RHEAUME have signed my name to this specification in the presence of two subscribing witnesses, this twenty-fifth day of January, 1907.

ALPHONSE S. RHEAUME.

Witnesses:
FRANK M. ASHLEY,
GREEN B. RAINN, Jr.